US012789973B2

(12) United States Patent
Dunbar et al.

(10) Patent No.: US 12,789,973 B2
(45) Date of Patent: Nov. 10, 2026

(54) DRAIN MAST

(71) Applicant: The Boeing Company, Arlington, VA (US)

(72) Inventors: Grant Dunbar, Kirkland, WA (US); Christopher Vegter, Kirkland, WA (US)

(73) Assignee: The Boeing Company, Arlington, VA (US)

(*) Notice: Subject to any disclaimer, the term of this patent is extended or adjusted under 35 U.S.C. 154(b) by 59 days.

(21) Appl. No.: 18/439,772

(22) Filed: Feb. 13, 2024

(65) Prior Publication Data

US 2025/0256831 A1 Aug. 14, 2025

(51) Int. Cl.
*B64C 1/14* (2006.01)

(52) U.S. Cl.
CPC .................................. *B64C 1/1453* (2013.01)

(58) Field of Classification Search
CPC .................................................... B64C 1/1453
See application file for complete search history.

(56) References Cited

U.S. PATENT DOCUMENTS

| | | | | |
|---|---|---|---|---|
| 5,290,996 | A | 3/1994 | Giamati et al. | |
| 6,425,554 | B1 * | 7/2002 | Moreland | B64C 1/1453 244/1 R |
| 9,315,253 | B2 * | 4/2016 | Lee | B64C 1/1453 |
| 10,829,194 | B2 | 11/2020 | Wozniak | |
| 2005/0230547 | A1 * | 10/2005 | Giamati | B64C 1/1453 244/129.1 |
| 2006/0249628 | A1 * | 11/2006 | Turner | B64C 1/1453 244/129.1 |
| 2013/0327059 | A1 * | 12/2013 | Richardson | B64C 1/1453 60/797 |
| 2014/0158208 | A1 | 6/2014 | Becks et al. | |
| 2017/0122128 | A1 * | 5/2017 | Lacko | F01D 25/32 |

* cited by examiner

*Primary Examiner* — Angelisa L. Hicks
(74) *Attorney, Agent, or Firm* — Joseph M. Butscher; Carroll, Hoette & Butscher, LLC

(57) ABSTRACT

A drain mast includes a mast section. The mast section includes a drain line. The drain line routes a liquid from an upper portion of the mast section to a lower portion of the mast section. The drain mast also includes a body section attached to the mast section. The body section has a convex-curved surface that includes one or more outlet holes. The convex-curved surface of the body section creates a low-pressure area proximate to the one or more outlet holes to enable the liquid from the lower portion of the mast section to drain through the one or more outlet holes.

21 Claims, 5 Drawing Sheets

DRAIN MAST

FIELD

The present disclosure generally relates to a drain mast, and more particularly, to a drain mast that provides outlet suction.

BACKGROUND

This background description is provided for the purpose of generally presenting the context of the disclosure. Unless otherwise indicated herein, material described in this section is neither expressly nor impliedly admitted to be prior art to the present disclosure or the appended claims.

An aircraft can use a drain mast to eject fluid from itself during flight. The fluid travels though the drain tube and is ejected into a surrounding airflow stream during flight via a cavity in the drain mast. In particular, the fluid may be drained from a region of low pressure in the cavity to a region of high pressure outside of the aircraft.

However, in some scenarios, the force of gravity is not strong enough to move the fluid against the pressure gradient, causing backflow in the drain tube. For example, a traditional drain mast may not create strong enough suction forces at the drain outlet to force the fluid outside of the aircraft.

SUMMARY

The present application is directed to an improved drain mast for an aircraft. In particular, the present application is directed to a drain mast that has low pressure region proximate to a drain outlet to enable liquid (e.g., water waste) to be ejected via the drain outlet. For example, the drain mast may include a body section that has a convex-curved surface that includes one or more drain outlet holes. The convex-curved surface of the body section creates a low-pressure area proximate to the one or more drain outlet holes. As a result, the low pressure created on the surface of the body section proximate to the one or more drain outlet holes is lower than the pressure volume from which the liquid is being drained. As a result, a forward pressure gradient is created which drives the liquid out of the aircraft. The drain outlet holes are used to vent the liquid out of the aircraft and into the airstream. The body section is mounted on a mast to (i) position the body section outside an aerodynamic boundary layer of the aircraft and (ii) separate the fluid being drained from the exterior surface of the aircraft.

In one aspect, the present application discloses a drain mast. The drain mast includes a mast section. The mast section includes a drain line. The drain line routes a liquid from an upper portion of the mast section to a lower portion of the mast section. The drain mast also includes a body section attached to the mast section. The body section has a convex-curved surface that includes one or more outlet holes. The convex-curved surface of the body section creates a low-pressure area proximate to the one or more outlet holes to enable the liquid from the lower portion of the mast section to drain through the one or more outlet holes.

In another aspect, the present application discloses an aircraft. The aircraft includes an aircraft component and a drain mast coupled to the aircraft component. The drain mast includes a mast section. The mast section includes a drain line. The drain line routes a liquid from an upper portion of the mast section to a lower portion of the mast section. The drain mast also includes a body section attached to the mast section. The body section has a convex-curved surface that includes one or more outlet holes. The convex-curved surface of the body section creates a low-pressure area proximate to the one or more outlet holes to enable the liquid from the lower portion of the mast section to drain through the one or more outlet holes.

In another aspect, the present application discloses a method of manufacturing a drain mast. The method includes manufacturing a mast section of the drain mast. The mast section includes a drain line. The drain line routes a liquid from an upper portion of the mast section to a lower portion of the mast section. The drain mast also includes a body section attached to the mast section. The method also includes manufacturing a body section of the drain mast that is attached to the mast section. The body section has a convex-curved surface that includes one or more outlet holes. The convex-curved surface of the body section creates a low-pressure area proximate to the one or more outlet holes to enable the liquid from the lower portion of the mast section to drain through the one or more outlet holes.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE DRAWINGS

A more complete understanding of embodiments of the present application may be derived by referring to the detailed description and claims when considered in conjunction with the following figures, wherein like reference numbers may refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
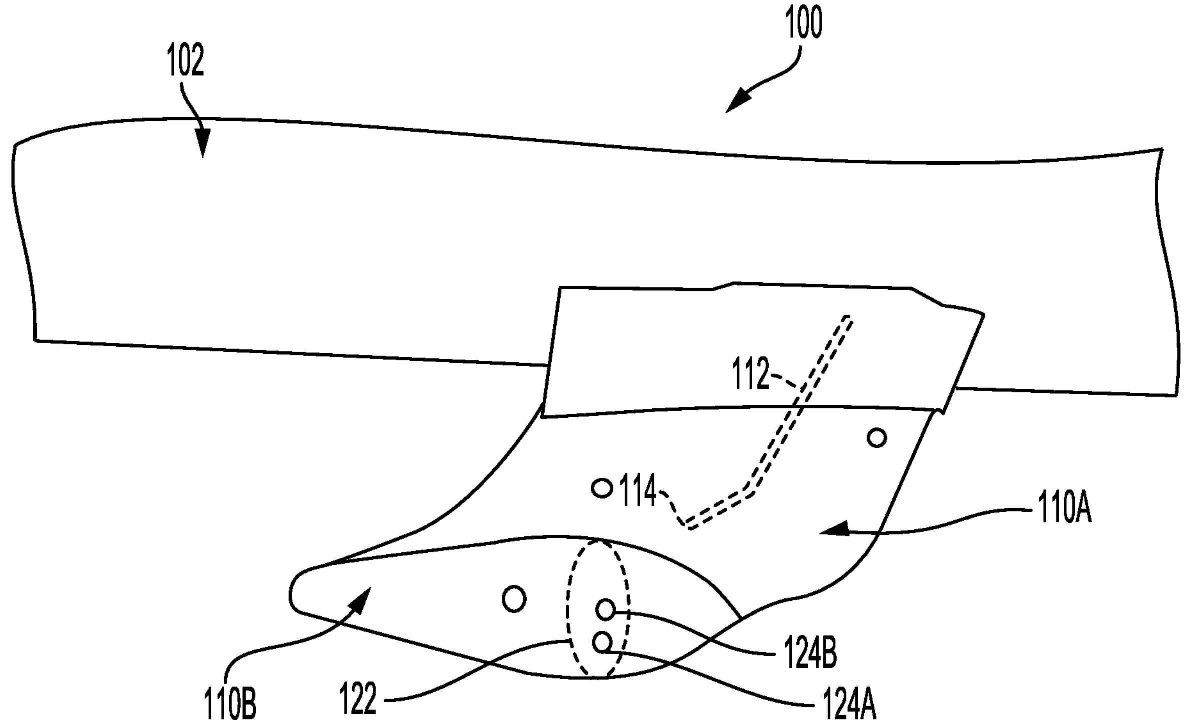
FIG. 1 illustrates an architecture that includes an aircraft drain mast, according to an exemplary embodiment.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features may be designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, outlet holes are illustrated and associated with reference number 124. When referring to a particular one of the outlet holes, such as the outlet hole 124A, the distinguishing letter "A" is used. However, when referring to any arbitrary one of the outlet holes or to the outlet holes as a group, the reference number 124 may be used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

Referring to FIG. 1, an architecture 100 that includes an aircraft drain mast is illustrated, in accordance with an exemplary embodiment. The architecture 100 includes a fuselage 102 of an aircraft and a drain mast 110 coupled to the fuselage 102. Although the drain mast 110 is depicted as being coupled to the fuselage 102, in other implementations, the drain mast 110 can be coupled to other components of an aircraft. As a non-limiting example, in some implementations, the drain mast 110 can be coupled to a lower surface of an aircraft wing, an engine nacelle, etc.

Figure 2:
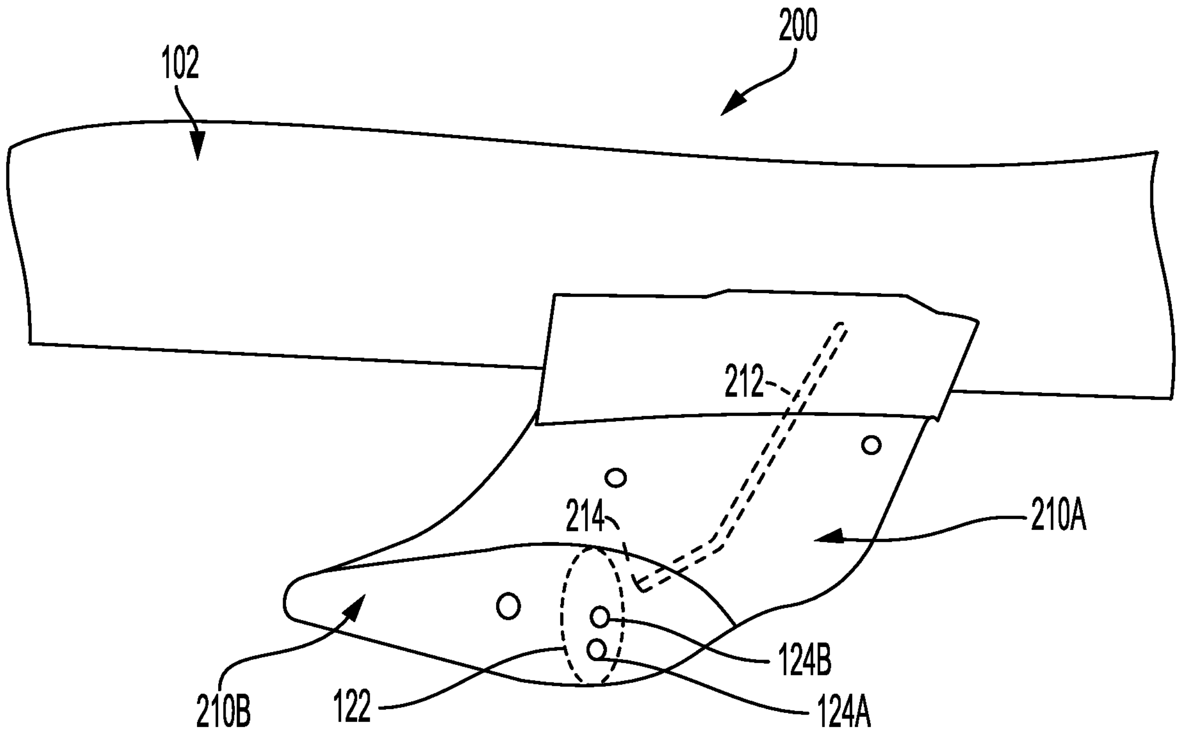
FIG. 2 illustrates another architecture that includes an aircraft drain mast, according to an exemplary embodiment.

The drain mast 110 includes a mast section 110A and a body section 110B that is attached to the mast section 110A. The mast section 110A of the drain mast 110 includes a drain line 112 (e.g., a drain tube) that routes a liquid from an upper portion of the mast section 110A to a lower portion of the mast section 110A. According to one implementation, the liquid includes water. According to another implementation, the liquid includes fuel. According to another implementation, the liquid includes hydraulic fluid. It should be understood that water, fuel, and hydraulic fluid are merely non-limiting examples of liquids that can be drained from the drain mast 110. In other implementations, different liquids can be drained from the drain mast 110. As illustrated in FIG. 1, an outlet 114 of the drain line 112 is located in the lower portion of the mast section 110A. However, in some implementations, the outlet 114 of the drain line 112 may extend into the body section 110B of the drain mast 110, as depicted in FIG. 2.

In some embodiments, the drain mast 110 can include a continuous section (e.g., a single piece). For example, the mast section 110A and the body section 110B can be manufactured as a continuous section, as opposed to two separate sections that are attached.

As illustrated in FIG. 1, the body section 110B of the drain mast 110 has a convex-curved surface that includes one or more outlet holes 124. The convex-curved surface of the body surface of the body section 110B creates a low-pressure area 122 that is proximate to the one or more outlet holes 124. For example, in FIG. 1, the low-pressure area 122 of the body section 110B includes two outlet holes 124A, 124B. Although two (2) outlet holes 124A, 124B are depicted in the low-pressure area 122, in other implementations, additional (or fewer) outlet holes 124 can be included in the low-pressure area 122. As a non-limiting example, in some scenarios, the low-pressure area 122 can include five (5) outlet holes 124. As another non-limiting example, in some scenarios, the low-pressure area 122 can include a single outlet hole. In some implementations, the outlet holes 124 are located at a bottom portion of the body section 110B.

The low-pressure area 122 enables the liquid from the lower portion of mast section 110A to drain through the outlet holes 124A, 124B. For example, the low pressure created on the surface of the body section 110B proximate to the outlet holes 124 (e.g., created at the low-pressure area 122) is lower than the pressure volume from which the liquid is being drained. As a result, a forward pressure gradient is created which drives the liquid out of the aircraft. The outlet holes 124 are used to vent the liquid out of the aircraft and into the airstream. The body section 110B may be positioned outside an aerodynamic boundary layer of the aircraft to prevent the liquid from draining on an exterior surface of the aircraft.

Referring to FIG. 2, another architecture 200 that includes an aircraft drain mast is illustrated, in accordance with an exemplary embodiment. The architecture 200 includes the fuselage 102 of an aircraft and a drain mast 210 coupled to the fuselage 102.

The drain mast 210 is substantially similar to the drain mast 110 of FIG. 1. For example, the drain mast 210 includes a mast section 210A and a body section 210B attached to the mast section 210A. The mast section 210A of the drain mast 210 includes a drain line 212 that routes a liquid from an upper portion of the mast section 210A to an upper portion of the body section 210B. Thus, in the architecture of FIG. 2, an outlet 214 of the drain line 212 may extend into the body section 210B of the drain mast 210.

Similar to the architecture 100 of FIG. 1, the body section 210B of the drain mast 210 has a convex-curved surface that includes the one or more outlet holes 124. The convex-curved surface of the body surface of the body section 210B creates the low-pressure area 122 that is proximate to the one or more outlet holes 124.

The low-pressure area 122 enables the liquid from the lower portion of mast section 210A to drain through the outlet holes 124A, 124B. For example, the low pressure created on the surface of the body section 210B proximate to the outlet holes 124 (e.g., created at the low-pressure area 122) is lower than the pressure volume from which the liquid is being drained. As a result, a forward pressure gradient is created which drives the liquid out of the aircraft. The outlet holes 124 are used to vent the liquid out of the aircraft and into the airstream. The body section 210B may be positioned outside an aerodynamic boundary layer of the aircraft to prevent the liquid from draining on an exterior surface of the aircraft.

Figure 3:
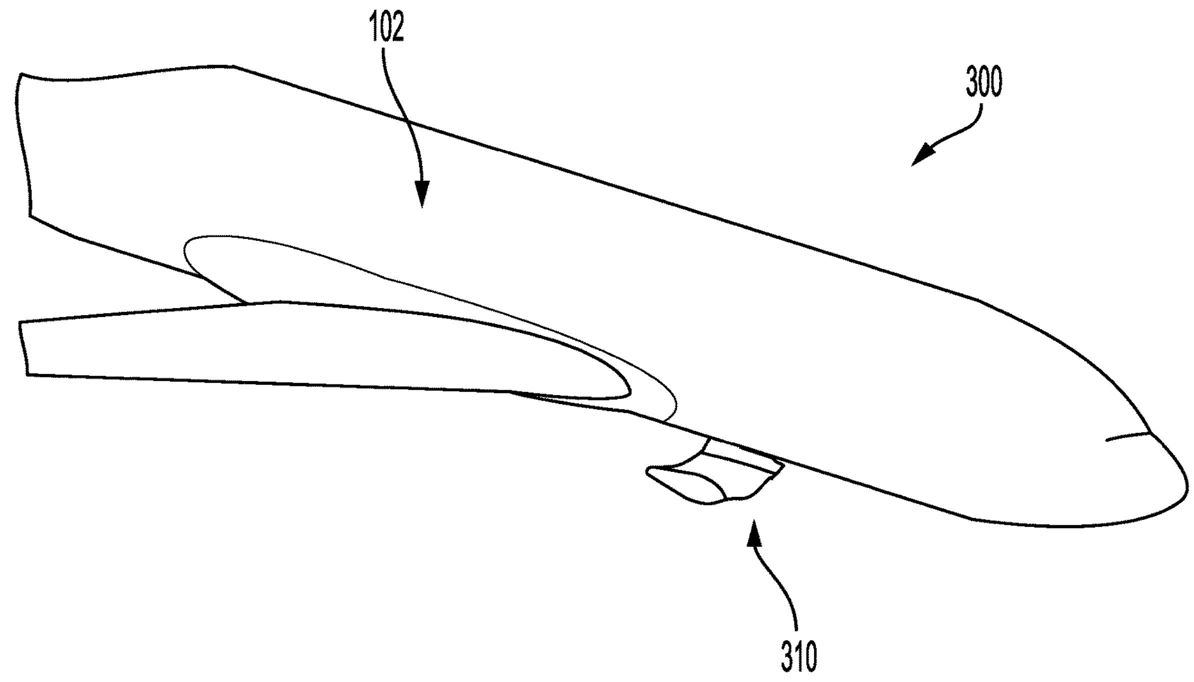
FIG. 3 illustrates an aircraft that includes a drain mast, according to an exemplary embodiment.

Referring to FIG. 3, an aircraft 300 that includes an aircraft drain mast is illustrated, in accordance with an exemplary embodiment.

The aircraft 300 includes the fuselage 102 and a drain mast 310 that is coupled to the fuselage. According to some implementations, the drain mast 310 corresponds to the drain mast 110 of FIG. 1. According to other implementations, the drain mast 310 corresponds to the drain mast 210 of FIG. 2. As depicted in FIG. 3, a body section (e.g., the body section 110B or the body section 210B) of the drain mast 310 is outside an aerodynamic boundary layer of the aircraft 300 to prevent liquid from draining on an exterior surface of the aircraft 300.

Figure 4:
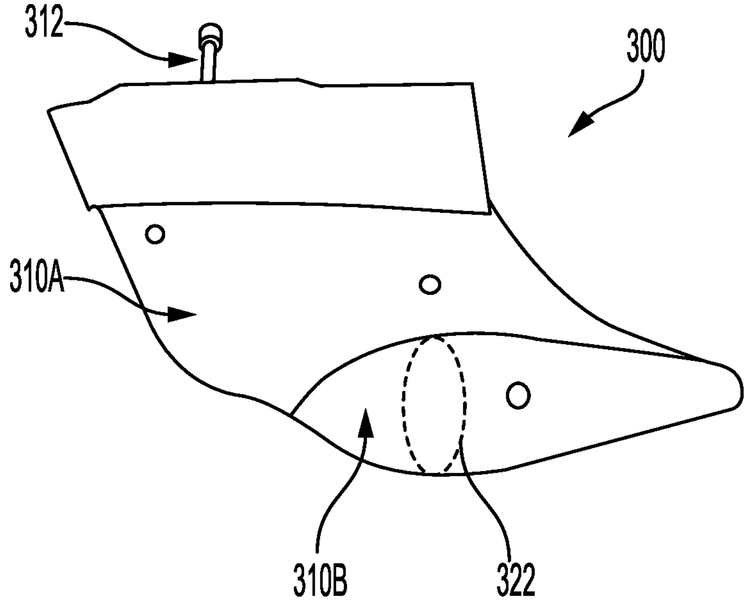
FIG. 4 illustrates an aircraft drain mast, according to an exemplary embodiment.

Referring to FIG. 4, the drain mast 310 is illustrated, in accordance with an exemplary embodiment.

The drain mast 310 includes a mast section 310A and a body section 310B that is attached to the mast section 310A. The mast section 310A of the drain mast 310 includes a drain line 312 that routes a liquid from an upper portion of the mast section 310A to a lower portion of the mast section 310A.

As illustrated in FIG. 4, the body section 310B of the drain mast 310 has a convex-curved surface that includes one or more outlet holes (not shown in FIG. 4). The convex-curved surface of the body surface of the body section 410B creates a low-pressure area 322 that is proximate to the one or more outlet holes.

The low-pressure area 322 enables the liquid, from the drain line 312, to drain through the outlet holes. For example, the low pressure created on the surface of the body section 310B proximate to the outlet holes (e.g., created at the low-pressure area 322) is lower than the pressure volume from which the liquid is being drained. As a result, a forward pressure gradient is created which drives the liquid out of the body section 310B.

Figure 5:
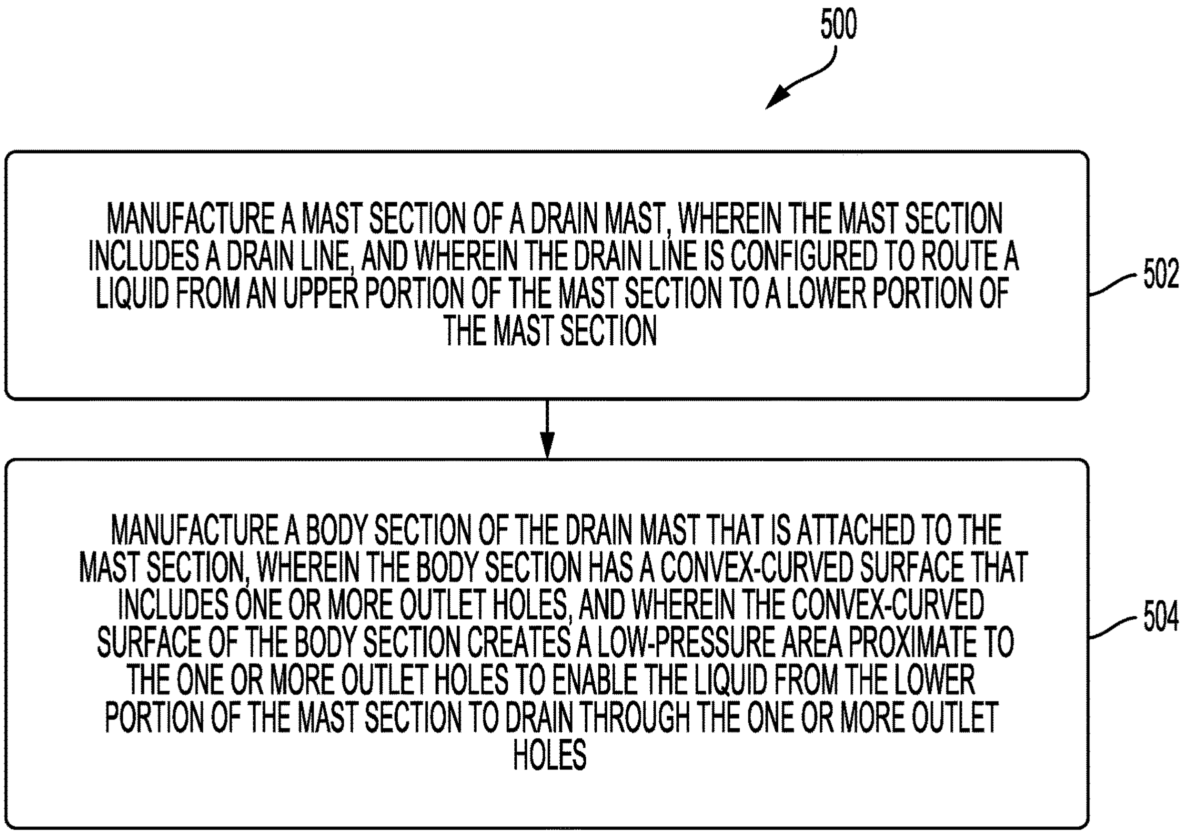
FIG. 5 is a flowchart of an example of an implementation of a method, according to an exemplary embodiment.

FIG. 5 illustrates a flow chart of a method 500, according to an exemplary embodiment.

The method 500 includes manufacturing a mast section of a drain mast, at block 502. The mast section includes a drain line, and the drain line is configured to route a liquid from an upper portion of the mast section to a lower portion of the mast section. For example, referring to FIG. 1, the mast section 110A of the drain mast 110 may be manufactured. The mast section 110A includes the drain line 112, and the drain line 112 is configured to route a liquid from the upper portion of the mast section 110A to the lower portion of the mast section 110A.

The method 500 also includes manufacturing a body section of the drain mast that is attached to the mast section, at block 504. The body section has a convex-curved surface that includes one or more outlet holes. The convex-curved surface of the body section creates a low-pressure area proximate to the one or more outlet holes to enable the liquid from the lower portion of the mast section to drain through the one or more outlet holes. For example, referring to FIG. 1, the body section 110B of the drain mast 110 that is attached to the mast section 110A may be manufactured. The body section 110B has a convex-curved surface that includes the outlet holes 124A, 124B. The convex-curved surface of the body section 110B creates the low-pressure area 122 proximate to the outlet holes 124A, 124B to enable the liquid from the lower portion of the mast section 110A to drain through the outlet holes 124A, 124B.

According to one implementation of the method 500, an outlet of the drain line extends into the body section. For example, referring to FIG. 2, the outlet 214 of the drain line 212 extends into the body section 210B of the drain mast 210.

According to one implementation of the method 500, an outlet of the drain line is located in the lower portion of the mast section. For example, referring to FIG. 1, the outlet 114 of the drain line 112 is located in the lower portion of the mast section 110A.

According to one implementation of the method 500, an outlet of the drain line is positioned proximate to the one or more outlet holes. For example, referring to FIG. 2, the outlet 214 of the drain line 212 is positioned proximate to the outlet holes 124A, 124B. In some implementations of the method 500, an outlet of the drain line is coupled to the one or more outlet holes.

According to one implementation of the method 500, the one or more outlet holes are located at a bottom portion of the body section. For example, referring to FIG. 1, the outlet holes 124A, 124B are located at the bottom portion of the body section 110B of the drain mast 110.

According to one implementation of the method 500, the body section is positioned outside an aerodynamic boundary layer of an aircraft to prevent the liquid from draining on an exterior surface of the aircraft. The low pressure created on the surface of the body section 110B proximate to the outlet holes 124 (e.g., created at the low-pressure area 122) is lower than the pressure volume from which the liquid is being drained. As a result, a forward pressure gradient is created which drives the liquid out of the aircraft. The outlet holes 124 are used to vent the liquid out of the aircraft and into the airstream.

Although the systems are described herein with specific reference to aircraft systems or aerospace vehicles, in other embodiments, the system can be a vehicle other than an aircraft without departing from the essence of the present disclosure.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

While the systems and methods of operation have been described with reference to certain examples, it will be understood by those skilled in the art that various changes can be made and equivalents can be substituted without departing from the scope of the claims. Therefore, it is intended that the present methods and systems not be limited to the particular examples disclosed, but that the disclosed methods and systems include all embodiments falling within the scope of the appended claims.

The invention claimed is:

1. A drain mast comprising:

a mast section that includes a drain line, wherein the drain line routes a liquid from an upper portion of the mast section to a lower portion of the mast section; and a body section attached to the mast section, wherein the body section has a convex-curved surface that includes one or more outlet holes, wherein the convex-curved surface is convex when viewed from a side of the drain mast, and wherein the convex-curved surface is not within any concave portion, wherein the one or more outlet holes are within the convex-curved surface, wherein the convex-curved surface of the body section creates a low-pressure area proximate to the one or more outlet holes to enable the liquid from the lower portion of the mast section to drain through the one or more outlet holes, and wherein the convex-curved surface comprises a top convex-curved portion of the body section, and a bottom convex-curved portion of the body section.

2. The drain mast of claim 1, wherein an outlet of the drain line extends into the body section.

3. The drain mast of claim 1, wherein an outlet of the drain line is located in the lower portion of the mast section.

4. The drain mast of claim 1, wherein an outlet of the drain line is positioned proximate to the one or more outlet holes.

5. The drain mast of claim 1, wherein an outlet of the drain line is coupled to the one or more outlet holes.

6. The drain mast of claim 1, wherein the one or more outlet holes are located at a bottom portion of the body section.

7. The drain mast of claim 1, wherein the body section is positioned outside an aerodynamic boundary layer of an aircraft to prevent the liquid from draining on an exterior surface of the aircraft.

8. The drain mast of claim 1, wherein the liquid includes water, fuel, or hydraulic fluid.

9. The drain mast of claim 1, wherein each exterior surface of the body section has the convex-curved surface.

10. An aircraft comprising:

an aircraft component; and a drain mast coupled to the aircraft component, the drain mast comprising:

a mast section that includes a drain line, wherein the drain line routes a liquid from an upper portion of the mast section to a lower portion of the mast section; and a body section attached to the mast section, wherein the body section has a convex-curved surface that includes one or more outlet holes, wherein the convex-curved surface is convex when viewed from a side of the drain mast, and wherein the convex-curved surface is not within any concave portion, wherein the one or more outlet holes are within the convex-curved surface, wherein the convex-curved surface of the body section creates a low-pressure area proximate to the one or more outlet holes to enable the liquid from the lower portion of the mast section to drain through the one or more outlet holes, and wherein the convex-curved surface comprises a top convex-curved portion of the body section, and a bottom convex-curved portion of the body section.

11. The aircraft of claim 10, wherein an outlet of the drain line extends into the body section.

12. The aircraft of claim 10, wherein an outlet of the drain line is located in the lower portion of the mast section.

13. The aircraft of claim 10, wherein an outlet of the drain line is coupled to the one or more outlet holes.

14. The aircraft of claim 10, wherein the one or more outlet holes are located at a bottom portion of the body section.

15. The aircraft of claim 10, wherein the body section is positioned outside an aerodynamic boundary layer of the aircraft to prevent the liquid from draining on an exterior surface of the aircraft.

16. The aircraft of claim 10, wherein the liquid includes water, fuel, or hydraulic fluid.

17. A method of manufacturing a drain mast, the method comprising:

manufacturing a mast section of the drain mast, wherein the mast section includes a drain line, and wherein the drain line is configured to route a liquid from an upper portion of the mast section to a lower portion of the mast section; and manufacturing a body section of the drain mast that is attached to the mast section, wherein the body section has a convex-curved surface that includes one or more outlet holes, wherein the convex-curved surface is convex when viewed from a side of the drain mast, and wherein the convex-curved surface is not within any concave portion, wherein the one or more outlet holes are within the convex-curved surface, wherein the convex-curved surface of the body section creates a low-pressure area proximate to the one or more outlet holes to enable the liquid from the lower portion of the mast section to drain through the one or more outlet holes, and wherein the convex-curved surface comprises a top convex-curved portion of the body section, and a bottom convex-curved portion of the body section.

18. The method of claim 16, wherein an outlet of the drain line extends into the body section.

19. The method of claim 17, wherein an outlet of the drain line is located in the lower portion of the mast section.

20. The method of claim 17, wherein the one or more outlet holes are located at a bottom portion of the body section.

21. The method of claim 17, further comprising mounting the body section on a mast to position the body section outside an aerodynamic boundary layer of an aircraft.

* * * * *